(12) United States Patent
Aoyagi et al.

(10) Patent No.: US 6,181,529 B1
(45) Date of Patent: *Jan. 30, 2001

(54) SUSPENSION FOR DISK DRIVE AND WORKING METHOD THEREFORE

(75) Inventors: Akihiko Aoyagi, Fujisawa; Kazuhiko Otake, Atsugi; Takeshi Kamisaku, Kanagawa-ken; Hitoshi Suzuki, Sagamihara, all of (JP)

(73) Assignees: NHK Spring Co., Ltd., Yokohama (JP); International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/158,474

(22) Filed: Sep. 22, 1998

(30) Foreign Application Priority Data

Sep. 24, 1997 (JP) .................................................. 9-258691

(51) Int. Cl.$^7$ ............................... G11B 5/54; G11B 21/22
(52) U.S. Cl. .............................................................. 360/255
(58) Field of Search ..................... 360/104, 254, 360/254.2, 254.7, 255, 255.6, 255.9, 244.2

(56) References Cited

U.S. PATENT DOCUMENTS

| | | | |
|---|---|---|---|
| 5,027,241 | * | 6/1991 | Hatch et al. ........................... 360/105 |
| 5,189,575 | * | 2/1993 | Onooka et al. ........................ 360/105 |
| 5,379,171 | * | 1/1995 | Morehouse et al. ................... 360/105 |
| 5,572,387 | * | 11/1996 | Brooks, Jr. et al. ................... 360/104 |
| 5,623,758 | * | 4/1997 | Brooks, Jr. et al. ............... 29/603.01 |
| 5,625,514 | * | 4/1997 | Kubo et al. ........................... 360/104 |
| 5,742,454 | * | 4/1998 | Vera et al. ............................ 360/105 |
| 5,862,018 | * | 1/1999 | Vera et al. ............................ 360/105 |
| 5,864,448 | * | 1/1999 | Berberich ............................. 360/105 |
| 5,892,637 | * | 4/1999 | Brooks, Jr. et al. ................... 360/104 |
| 5,973,870 | * | 10/1999 | Boutaghou et al. ................... 360/53 |

FOREIGN PATENT DOCUMENTS

| | | |
|---|---|---|
| 5-282642 | 10/1993 | (JP) . |
| 10-302421 | * 11/1998 | (JP) . |

OTHER PUBLICATIONS

IBM Technical Disclosure Bulletin, "Suspension Assembly with Corn Shape Load/Unload Tab" vol. 40 No. 02 Feb. 1997, pp. 55–57.*

* cited by examiner

Primary Examiner—William Klimowicz
(74) Attorney, Agent, or Firm—Frishauf, Holtz, Goodman, Langer & Chick, P.C.

(57) ABSTRACT

A loading/unloading lug is provided on the distal end portion of a load beam for use as a suspension body. The lug extends in the axial direction of the suspension body and is designed to run on a support member when suspension body is moved to a refuge zone. The cross section of the lug perpendicular to the axis of the suspension body is arcuate so that an outer surface in contact with the support member is convex, and the outer surface of the lug forms a smoothed surface smoothed by coining. The arithmetic mean roughness of the smoothed surface ranges from 0.01 μm to less than 0.2 μm.

5 Claims, 3 Drawing Sheets

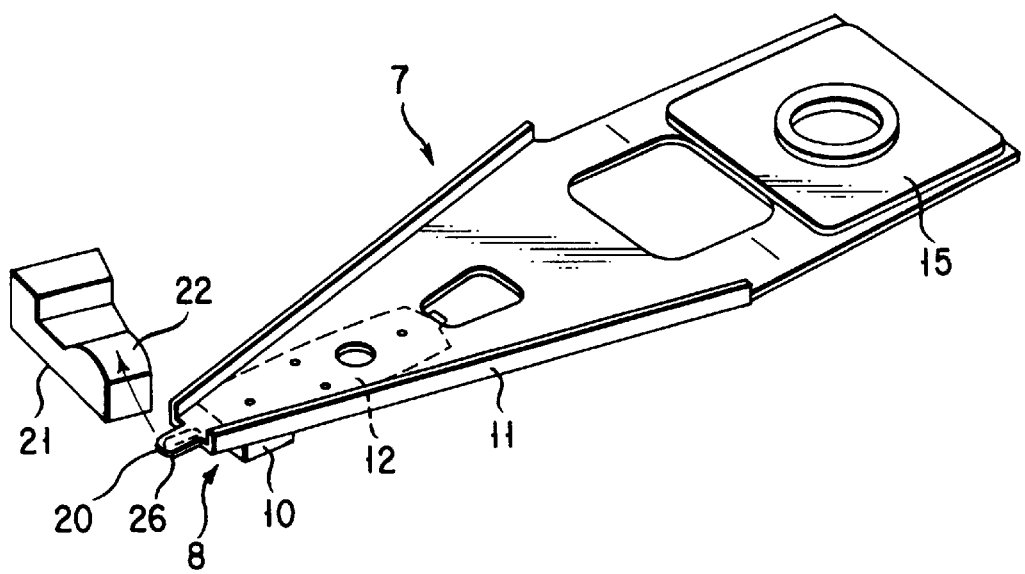
F I G. 1
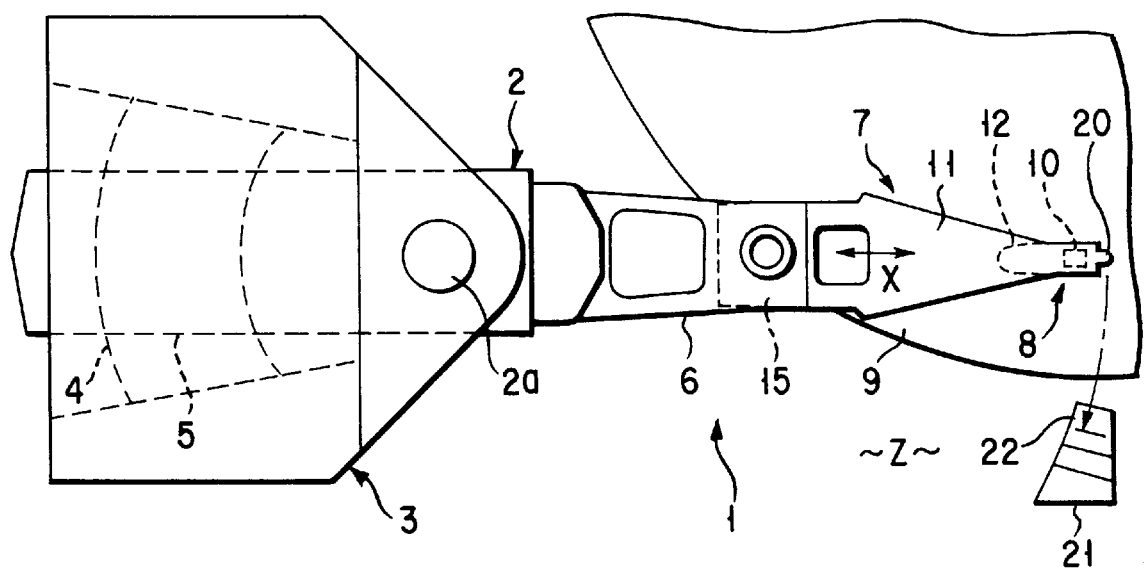
F I G. 2

SUSPENSION FOR DISK DRIVE AND WORKING METHOD THEREFORE

BACKGROUND OF THE INVENTION

The present invention relates to a suspension for supporting a head section of a disk drive stored in an information processing apparatus such as a personal computer, and more particularly, to an improvement of a suspension end portion.

A head section of a magnetic disk drive or the like that uses a hard disk includes a slider. Data are recorded in or retrieved from the disk by means of a transducer that is stored in the slider. The slider is supported by a suspension in a manner such that it can be lifted above the surface of the disk.

Conventionally, disk drives of this type are provided with means for evacuating the slider to a region outside the tracks of the disk when the disk is stopped from rotating. CSS (contact-start-stop) and L/UN (loading/unloading) systems are known examples of this evacuating means.

In the CSS system, the distal end portion of the suspension is moved to the inner peripheral portion of the disk when the disk is stopped. In order to prevent the slider from clinging to the surface of the stopped disk, according to the CSS system, the surface of the inner peripheral portion of the disk is roughened to a certain degree. Accordingly, the inner peripheral portion of the disk cannot be used as a recording area (tracks), so that the disk cannot enjoy a satisfactory recording capacity. The recording capacity may be increased by reducing the fly height of the slider, for example. According to the CSS system, however, the rough surface of the inner peripheral portion of the disk prevents the reduction of the fly height.

In the L/UN system or ramp-load system, on the other hand, a plastic ramp block is disposed beside the disk. When the disk is stopped from rotating, the suspension moves to a refuge zone beside the disk so that its distal end portion runs on the ramp block. Thereupon, the suspension is supported by the ramp block. This L/UN system does not require the surface of the inner peripheral portion of the disk to be roughened. Therefore, the fly height can be reduced, and the recording capacity can be made greater than in the case of the CSS system. According to the L/UN system, moreover, the inner peripheral portion of the disk can be also used as a recording area, thus facilitating augmentation of the capacity.

In the loading/unloading system, however, the contact between the suspension and the ramp block involves some problems. As the suspension repeatedly touches and leaves the ramp block, for example, a part of the plastic ramp block may be shaved, thereby producing fine contaminants. As the coefficient of friction between the suspension and the ramp block changes with time, moreover, control of the suspension may become difficult in some cases. Since the friction coefficient of the contact region between the suspension and the ramp block changes, furthermore, driving power for the movement of the suspension on the ramp block may become unstable.

BRIEF SUMMARY OF THE INVENTION

Accordingly, the object of the present invention is to provide a suspension for disk drive, capable of avoiding problems that are involved in contact between the suspension and a support member such as a ramp block, and a method for working the same.

In order to achieve the above object, a suspension according to the present invention comprises a loading/unloading lug extending in the axial direction of a suspension body from the distal end portion of the suspension body and adapted to run on a support member when the suspension body is moved to a refuge zone beside a disk. The cross section of the loading/unloading lug perpendicular to the axis of the suspension body is arcuate so that the surface in contact with the support member is convex. The outer surface of the lug forms a smoothed surface smoothed by coining.

According to the present invention, the support member can be prevented from being shaved by the loading/unloading lug in contact therewith, and there is no possibility of fine contaminants being produced or the coefficient of friction between the support member and the lug changing. Thus, the suspension can be easily controlled without entailing any change in shape of the support member, so that the loading and unloading operations of the suspension with respect to the support member are stable. Moreover, necessary driving power for the movement of the suspension on the support member is low and stable.

Preferably, the loading/unloading lug has a ridgeline extending in the axial direction of the suspension body such that the cross section of the lug perpendicular to the ridgeline is arcuate, and is embossed or bead-shaped so that the lug rises integrally with a part of the suspension body, at least the outer surface of the lug forming the smoothed surface. With the part of the suspension body thus rising integrally with the lug, the strength of the lug against bending load thereon can be improved effectively. With use of the loading/unloading lug having this shape, moreover, pressure on the contact surface of the lug on the support member can be lowered, and the support member can be restrained more effectively from being shaved.

The arithmetic mean roughness of the smoothed surface preferably ranges from 0.01 $\mu$m to less than 0.2 $\mu$m. With the surface roughness adjusted in this manner, the aforesaid object of the invention can be securely achieved by using feasible dies for coining.

A manufacturing method for the suspension according to the present invention comprises pressing a metal sheet, a material of the suspension body, by means of a die, thereby forming the metal sheet, and coining the loading/unloading lug in the thickness direction by means of a coining die having a smooth surface, thereby smoothing the outer surface of the lug and improving the strength of the lug.

According to the manufacturing method of the invention, the lug is coined as the suspension body is pressed into a given shape, so that smoothing the outer surface of the loading/unloading lug does not require use of any additional processes or equipment. Thus, the processes can be controlled with ease, and the costs can be lowered.

Coining the lug not only smoothes its outer surface but also allows its strength to be improved by work hardening and as its metallic structure is compacted by forging. Thus, the lug and its surroundings can be improved in durability. Since the lug has an arcuately raised sectional shape that is resistant to bending force, moreover, it cannot be easily deformed when it runs on the support member.

Possibly, the surface of the loading/unloading lug may be smoothed by surface treatment, such as electropolishing or coating. However, electropolishing and coating require a separate process for shaping the suspension body, besides a process for pressing it, thus entailing higher costs and laborious process control. According to the present invention, therefore, the surface roughness of the lug is improved by the coining operation that can be carried out simultaneously with the process for pressing the suspension body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view showing a suspension for disk drive and a support member according to an embodiment of the present invention;

FIG. 2 is a plan view showing the suspension of FIG. 1 and a part of a disk;

DETAILED DESCRIPTION OF THE INVENTION

Figure 3:
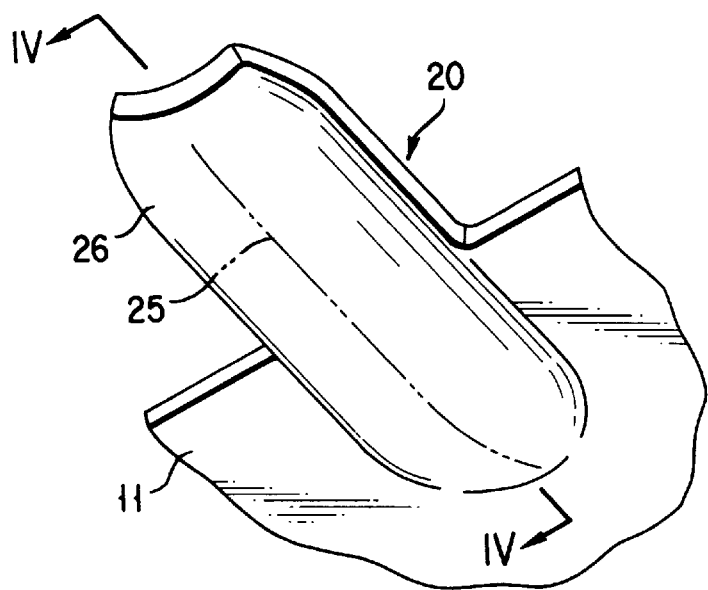
FIG. 3 is a perspective view showing a loading/ unloading lug of the suspension of FIG. 1.

An embodiment of the present invention will now be described with reference to the drawings of FIGS. 1 to 7.

FIG. 2 shows a part of a hard disk drive (abbreviated as HDD) 1 that comprises a suspension 7 of the loading/ unloading type. A carriage 2 of the disk drive 1 is turned around a shaft 2a by means of a motor 3 for positioning, such as a voice-coil motor. The carriage 2 is composed of a coil portion 5 located near a magnet 4 of the motor 3, an arm (actuator arm) 6 fixed to the coil portion 5, the suspension 7 situated on the distal end of the arm 6, a head section 8 attached to the distal end portion of the suspension 7, etc. When the carriage 2 is turned around the shaft 2a by the motor 3, the suspension 7 moves along the disk 9, whereupon the head section 8 moves to a desired track of the disk 9. Provided beside the suspension 7 is a refuge zone Z by which the suspension 7 is sheltered while the disk 9 is stopped from rotating.

The head section 8 is provided with a slider 10, which is located in a position where it can be opposed to the tracks of the disk 9, and a built-in transducer (not shown) in the slider 10. When the slider 10 is slightly lifted above the disk 9 as the disk 9 is rotated at high speed, a conventional air bearing is formed between the disk 9 and the slider 10.

An example of the suspension 7 includes a load beam 11 as a suspension body, formed of a thin precision plate spring of stainless steel or the like, a springy flexure 12 formed of a very thin stainless-steel plate spring fixed to the beam 11, etc. The slider 10 is fixed to the flexure 12. The flexure 12 is fixed to the beam 11 by laser welding or the like. A base plate 15 is provided on the basal part of the beam 11. The beam 11 is fixed to the arm 6 of the carriage 2 by means of base plate 15.

It is advisable to use a metal sheet (blank with a thickness of scores of micrometers to 100 $\mu$m) of austenitic stainless steel, such as SUS304, as a material for the load beam 11. The SUS304 contains 0.08% or less of carbon, 1% or less of silicon, 2% or less of manganese, 0.04% or less of phosphorus, 0.03% or less of sulfur, 8 to 10.5% of nickel, 18 to 20% of chromium, and iron for the remainder.

A loading/unloading lug 20 is formed integrally on the distal end portion of the load beam 11. The lug 20 extends like a tongue in the direction of an axis X of the beam 11. The lug 20 is designed to run on a supporting surface 22 of a ramp block 21, an example of a support member, when the disk 9 is stopped, that is, when the suspension 7 is moved to the refuge zone Z. The ramp block 21 is a molded article of a synthetic resin. If necessary, fiber-reinforced plastics (FRP) may be used for the purpose.

Figure 4:
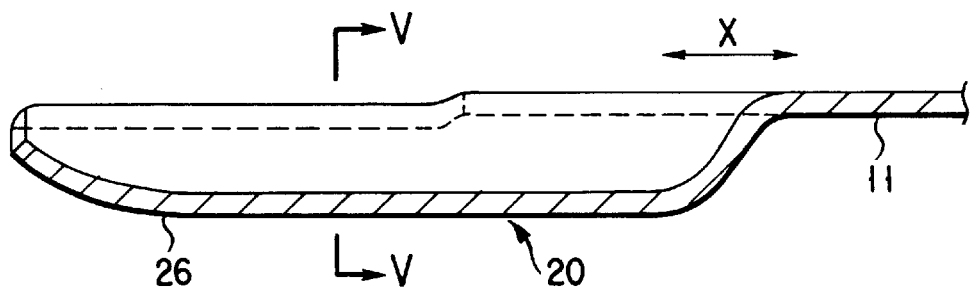
FIG. 4 is a sectional view taken along line IV—IV of FIG. 3.
Figure 5:
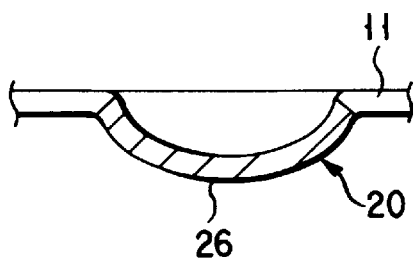
FIG. 5 is a sectional view taken along line V—V of FIG. 4.

As shown in FIGS. 3 and 4, the loading/unloading lug 20 rises integrally with a part of the load beam 11 in the direction of the axis X of the beam 11. The lug 20 is embossed having a ridgeline 25 (indicated by two-dot chain line in FIG. 3) that extends in the direction of the axis X on the outside. As shown in FIG. 5, the cross section of the lug 20 that crosses the ridgeline 25, that is, the cross section perpendicular to the axis X, is in the shape of a circular arc. At least the outer surface of the lug 20, which is in contact with the ramp block 21, forms a smoothed surface 26 that is smoothed by coining.

Figure 6:
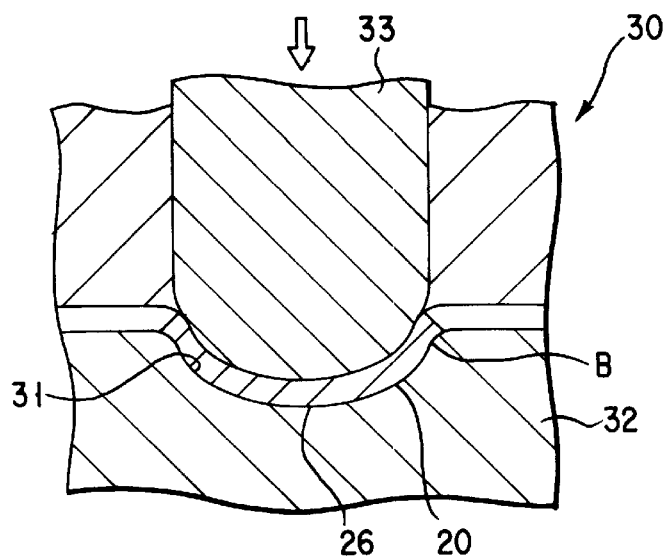
FIG. 6 is a sectional view showing the loading/ unloading lug and a die set for working the lug.

The smoothed surface 26 is smoothed to the following surface roughness by coining by means of a die set 30 illustrated in FIG. 6. More specifically, a metal sheet B for use as a material for the load beam 11 is pressed by means of the die set 30. The sheet B is previously trimmed into a predetermined shape. By this press operation, a to-be-worked portion of the beam 11 is formed into a desired shape. At the same time, coining is carried out by striking the lug 20 in the thickness direction between a coining die 32 having a smooth molding surface 31 and a punch 33 opposed to the die 32. By this coining operation, the convex or outer surface of the lug 20 is smoothed into the smoothed surface 26.

It is advisable to adjust the arithmetic mean roughness of the smoothed surface 26 within the range from 0.01 $\mu$m to less than 0.2 $\mu$m, and preferably to a target value of about 0.03 $\mu$m. According to the existing technique of die production, it is not practical, in technical and economical points of view, to work the molding surface 31 of the die 32 so that the surface roughness of the lug 20 is less than 0.01 $\mu$m. If the surface roughness of the lug 20 exceeds 0.2 $\mu$m, on the other hand, the surface is too rough to achieve the object of the present invention.

The surface roughness of the coining die 32 having the molding surface 31 is expected to be at least better than the target value (0.01 $\mu$m to less than 0.2 $\mu$m) of the roughness of the smoothed surface 26. If the lug 20 is struck by means of the die 32, its outer surface can be smoothed, and its mechanical strength can be improved also because the lug 20 is work-hardened and its metallic structure is compacted by cold forging. In this case, the thickness of the coined lug 20 is supposed to be a little smaller than that of the unworked metal sheet B.

Figure 7:
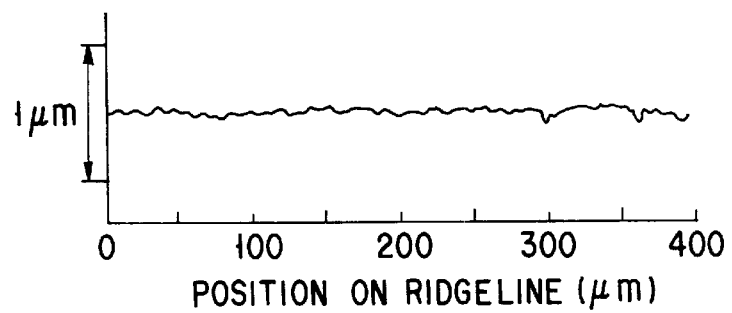
FIG. 7 is a diagram showing the result of measurement of the surface roughness of the loading/ unloading lug according to the embodiment of the invention.

FIG. 7 shows the result of measurement of the surface roughness of the coined lug 20 according to the above-mentioned embodiment along the ridgeline 25 by means of a measurer. This measurement result indicates that the arithmetic mean roughness of the smoothed surface 26 of the coined lug 20 is as good as about 0.03 μm. Having such a smooth surface, the lug 20 can never shave the ramp block (support member) 21 if it touches the block 21.

Figure 8:
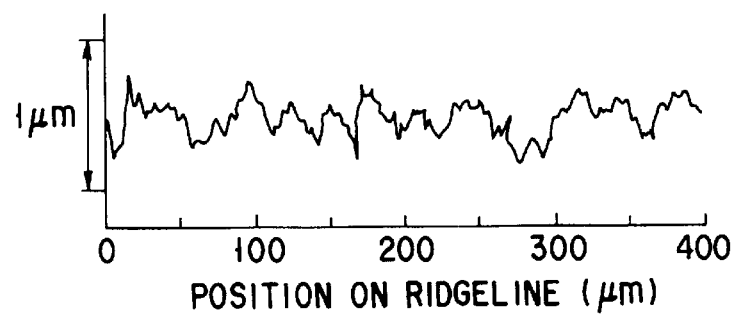
FIG. 8 is a diagram showing the result of measurement of the surface roughness of a conventional loading/unloading lug.

On the other hand, FIG. 8 shows the result of measurement of the surface roughness obtained in the case where the lug 20 is formed by simple pressing. It is conventionally known that simple pressing results in poorer surface roughness after working than before working. The measurement result shown in FIG. 8 indicates that the surface of the pressed lug is a rough surface with the roughness of about 0.20 μm. Such a rough surface may possibly shave the ramp block 21 when it touches the block 21.

It is to be understood that the present invention is not limited to the embodiment described above, and that the components of the invention, including the shapes of the suspension body, loading/unloading lug, support member, etc., may be suitably changed without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disk drive comprising:

a suspension body provided with a head section at a distal end portion thereof, a support member having a supporting surface in a refuge zone, and a loading/unloading lug having a ridgeline and extending in an axial direction of the suspension body from the distal end portion of the suspension body, said loading/unloading lug being a tongue-shaped member projected forward from a front edge of said suspension body and having a width which is less than a width of the front edge of said suspension body, and said loading/unloading lug being adapted to run on the support member when the suspension body is moved to the refuge zone, wherein a cross section of the loading/unloading lug perpendicular to the axial direction of the suspension body is arcuate and an outer surface of the loading/unloading lug which contacts the supporting surface of the support member is convex, said outer surface being smoothed by coining, and wherein said loading/unloading lug has curved portions which are located at front and rear axial ends thereof, respectively, and at which the ridgeline extends away from the supporting surface of the support member to a corresponding one of the front and rear axial ends.

2. The suspension for a disk drive according to claim 1, wherein said lug is embossed so that the lug rises integrally with a part of the suspension body.

3. The suspension for a disk drive according to claim 1, wherein the arithmetic mean roughness of said smoothed outer surface of the loading/unloading lug ranges from 0.01 μm to less than 0.2 μm.

4. A method of making the suspension of claim 1, comprising:

pressing a metal sheet using a die to form the suspension body, and coining the loading/unloading lug in a thickness direction thereof using a coining die having a smooth molding surface to form the smoothed outer surface of the loading/unloading lug.

5. The suspension for a disk drive according to claim 1, wherein said support member of said suspension is formed of a synthetic resin.

* * * * *